UNITED STATES PATENT OFFICE.

HENRY BLUMENBERG, JR., OF NEW YORK, N. Y.

BATTERY COMPOUND.

SPECIFICATION forming part of Letters Patent No. 638,042, dated November 28, 1899.

Application filed September 8, 1899. Serial No. 729,823. (No specimens.)

*To all whom it may concern:*

Be it known that I, HENRY BLUMENBERG, Jr., a citizen of the United States, residing at New York city, (Wakefield,) in the borough of Bronx, in the State of New York, have invented an Improvement in Battery Compounds, of which the following is a specification.

In Letters Patent No. 626,046, granted to me May 30, 1899, reference is made to a battery solution containing sulfate of aluminium, together with a bisulfate and a chlorate of the metals of the alkalies or alkali-earth metals.

In my present invention I find that it is advantageous to use instead of the sulfate of aluminium, as set forth in my aforesaid patent, a chlorid of a metal of the alkalies or alkaline-earth metals, such as chlorid of sodium, and to this I add a bisulfate and a chlorate of the metals of the alkalies or alkaline-earth metals. I have found that this composition, specifically stated as one consisting of chlorid of soda, bisulfate of soda, and chlorate of soda, gives excellent results in the various zinc-carbon type cells, and, furthermore, seems to recuperate somewhat more quickly than when the sulfate of aluminium is used, as in Patent No. 626,046. It, furthermore, gives the same electromotive force apparently and has somewhat lower internal resistance, and has the same advantages as other solutions— namely, that the zincs always keep clean, the cell does not polarize very quickly, it gives no creeping salts, and does not attack or tarnish the connections as much as the sal-ammoniac solution. The salt likewise is not so bulky and will not crystallize in the bottom of the glass jar. Furthermore, it has this advantage over all other solutions heretofore patented to me—namely, that it dissolves somewhat more rapidly.

I claim as my invention—

1. A compound for a battery solution consisting of a chlorid of the metals of the alkalies or alkaline-earth metals and a bisulfate and a chlorate of the metals of the alkalies or alkaline-earth metals, substantially as set forth.

2. A battery solution containing chlorid of soda, bisulfate of soda and chlorate of soda, substantially as set forth.

Signed by me this 7th day of September, 1899.

HENRY BLUMENBERG, JR.

Witnesses:
GEO. T. PINCKNEY,
S. T. HAVILAND.